Patented Dec. 18, 1934

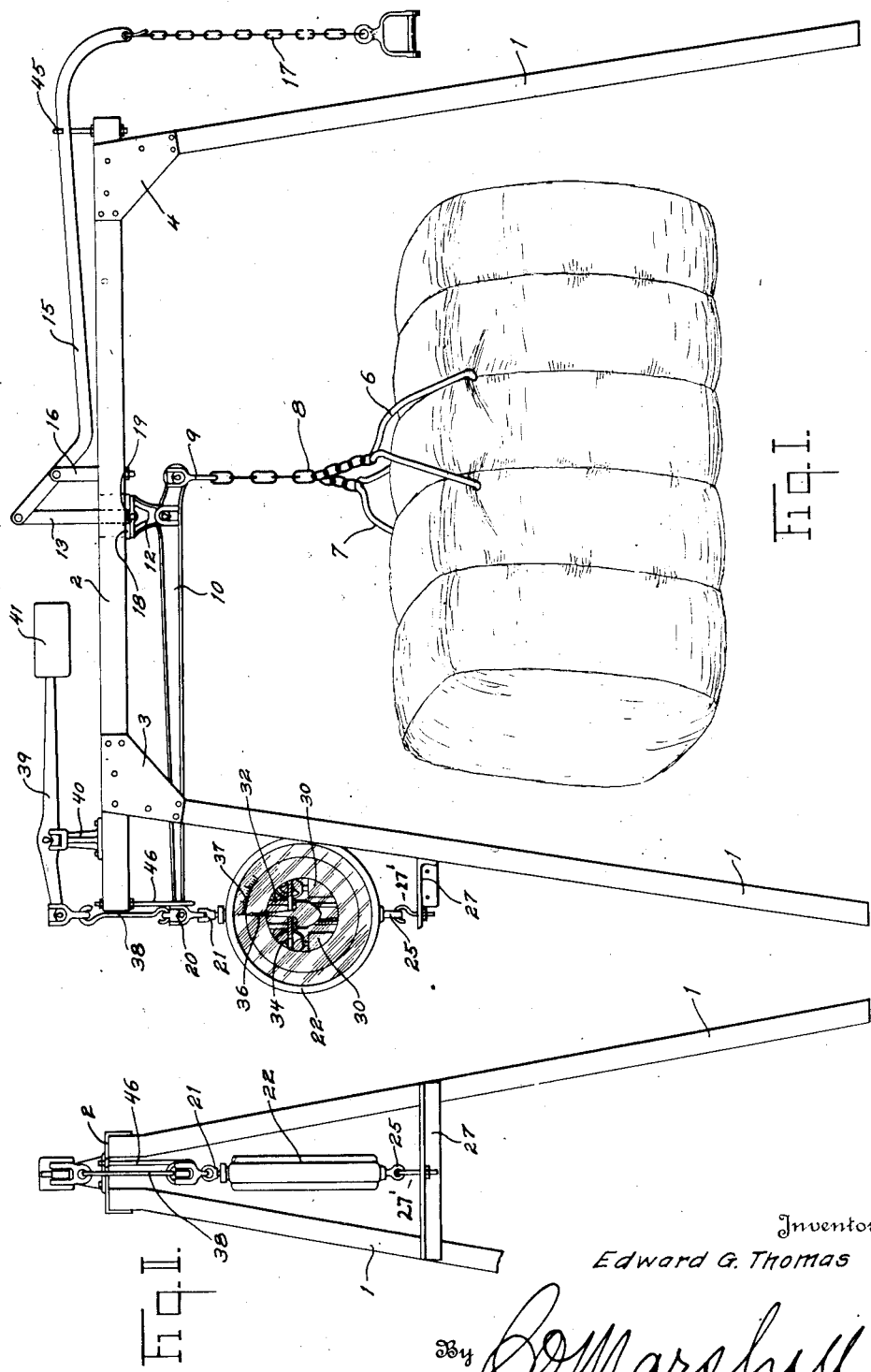

1,984,606

UNITED STATES PATENT OFFICE 1,984,606

WEIGHING SCALE

Edward G. Thomas, Toledo, Ohio, assignor to Toledo Scale Manufacturing Company, Toledo, Ohio, a corporation of New Jersey Application November 12, 1927, Serial No. 232,796

3 Claims. (Cl. 265—52)

This invention relates to weighing scales, and more particularly to mechanism for weighing bulky commodities which, by reason of their shapes or weight, it is desirable to weigh while suspended rather than while lying upon a platform or similar support. In the cotton warehouses it is particularly desirable to weigh comparatively heavy bales of cotton by means of a scale which may be easily transported from one place to another and which is provided with suitable means for engaging the bales to suspend them from the weighing mechanism without incurring unnecessary labor or time consuming operations. It is a usual occurrence in cotton warehouses that several bales of cotton may be weighed many times before the cotton is actually delivered to a purchaser, as at the time of each speculative sale the cotton is again weighed in order to satisfy the purchaser. One of the principal objects of this invention is the provision of a portable automatic weighing device for weighing comparatively heavy and bulky commodities.

Another object is the provision of a portable weighing system whereby the weight of the suspended commodity is indicated on a dial conveniently located adjacent the suspension member and at the right height for correct reading.

Still another object is the provision of a portable automatic weighing mechanism equipped with commodity handling means which may be operated without affecting or deranging the automatic weighing mechanism.

Other objects and advantages will be apparent from the following description, in which reference is had to the accompanying drawing illustrating a preferred embodiment of my invention and wherein similar reference numerals designate similar parts throughout the several views.

In the drawing:—

Figure I is a side elevational view of the device of my invention;

Figure II is an end elevational view of the device.

Referring to the drawing in detail, the frame of my device comprises four legs 1 L-shaped in cross-section and arranged in pairs, these legs converging at their upper ends, and secured to a bar 2 preferably of channel section, the assembled structure being braced by means of gusset plates 3 and 4. The commodity supporting means in the embodiment illustrated comprises a pair of hooks 6 and 7 connected by means of chains 8 to a stirrup 9 suitably suspended from a knife edge pivot fixed in one end of a lever 10. The lever 10 is suitably fulcrumed upon a bracket 12 suspended by means of a link 13 pivoted to one end of an operating lever or arm 15. This arm 15 is suitably fulcrumed upon a bracket 16 to the cross-bar 2 in juxtaposition to the link 13, the other end of the arm being provided with a chain 17 for convenience in operating the device. The bracket 12 is provided with a raised bead 19 which is received into a recess in the plate 18 when the lever 10 is moved into weighing position and serves to properly locate the lever. By this means the bracket 12 always engages the plate 18 in the same place, so that the fulcrum of the lever 10 is always in the same position during weighing operations, and therefore the relative position of the load suspended from the hooks 6 and 7 will not cause the lever 10 to swing or shift longitudinally.

The extremity of the lever 10 farthest from the fulcrum is provided with a pivot which is connected by means of a stirrup 20 to a member 21 secured to a watch-case-shaped housing 22 which supports and encloses the load-counterbalancing and indicating mechanism. A member 25 which is connected to the load-counterbalancing mechanism and is relatively movable thereto is secured to a bracket 27 fixed to the frame 1. It is well known that for best weighing results it is necessary that a lever move through an equal number of degrees above and below a horizontal line passing through its fulcrum pivot. The member 25 engages a hook $27^1$, which in turn is adjustably secured to the bracket 27. Adjusting this member $27^1$ up or down will adjust the position of the lever 10 without disturbing the balance of the automatic load-counterbalancing mechanism. This member 25 is connected by a system of levers (not shown) which are suitably connected by means of a pair of flexible metallic ribbons to a pair of load-counterbalancing pendulum 30 which are suspended from a frame 32 by means of flexible metallic ribbons, the pendulums being arranged to swing outwardly and upwardly to offset or counterbalance the weight of the commodity carried by the hooks 6 and 7. The pendulums are connected together by means of a flexible rectangular frame 34, the latter being connected by means of rack and pinion mechanism (not shown) to actuate an indicating hand 36 adapted to swing over and co-operate with a graduated chart 37 to automatically indicate the weight of the load. The automatic weighing mechanism is more fully described and claimed in Patent No. 1,577,009, to L. C. Wetzel, issued March 16, 1926, and, as it forms no part per se of the present invention, I will not describe it in further detail.

Connected to the stirrup 20 is a hook 38 which is connected to one end of a lever 39 suitably fulcrumed upon a bracket 40, the other end of the lever carrying a weight 41, the function of the weighted lever being to increase the upward pull upon the load-counterbalancing mechanism in order to provide sufficient initial force to "float" the pendulums, a factor which is well known to anyone skilled in the art of manufacturing weighing scales.

In the operation, the device is first moved to a position straddling a bale of cotton or other article to be weighed. The lever 15 is then released from engagement with the hook 45, thereby lowering the fulcrum bracket 12, one end of the lever 10 and the commodity hooks 6 and 7. The hooks may then be engaged with the bale of cotton and the lever 15 depressed by means of the chain 17 until it engages the hook 45. This movement of the lever 15 swings the bale free of its support and brings the bracket into engagement with the positioning plate 18. The weight of the bale of cotton may then be had by noting the position of the indicator 36 relative to the graduations on the chart 37. A subsequent release of the lever 15 will lower the bale and the weighing device may then be moved to another weighing position. The mechanism is prevented from becoming deranged when not in use by means of a hook-like member 46, the loop of which serves to support one end of the lever 10, stirrup 20 and associated mechanism, when there is no load carried by the commodity-receiving hooks.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a frame, automatic load-counterbalancing mechanism, means for supporting and counterbalancing the weight of said automatic load-counterbalancing mechanism, a lever, means connecting said lever to said automatic load-counterbalancing mechanism, load-supporting means depending from said lever, manually operated means for moving said lever to swing said load into weighing position, and means for properly locating said lever with respect to said frame when it is in weighing position.

2. In a device of the class described, in combination, a frame, automatic load-counterbalancing mechanism, means for supporting and counterbalancing the weight of said automatic load-counterbalancing mechanism, a lever, means connecting said lever to said automatic load-counterbalancing mechanism, load-supporting means depending from said lever, and manually operated means for moving said lever to swing said load into weighing position.

3. In a device of the class described, in combination, a portable frame, a lever mounted on said frame, automatic load-counterbalancing mechanism attached to said lever and counterbalanced by a weight secured to said lever, a load support connected to said automatic load-counterbalancing mechanism, and means including an operating lever for moving said load support into proper weighing position.

EDWARD G. THOMAS.